Jan. 23, 1940. B. J. CRAIG 2,187,934
VEHICLE DOOR LATCH CONTROL MECHANISM
Filed May 7, 1938 4 Sheets-Sheet 3
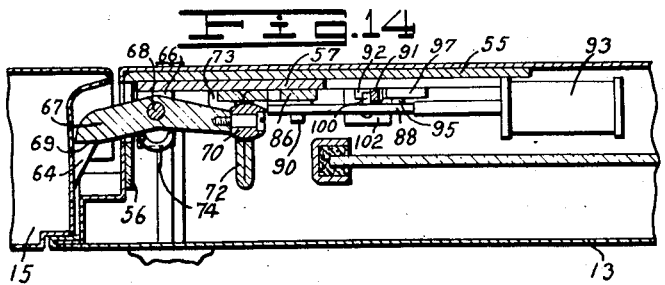
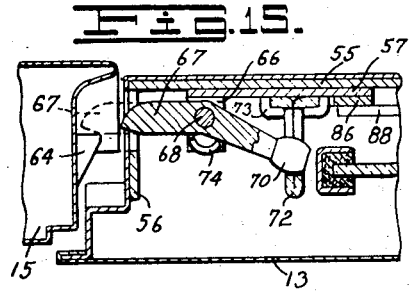
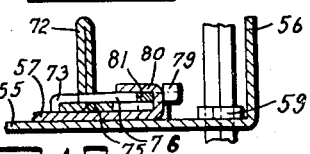
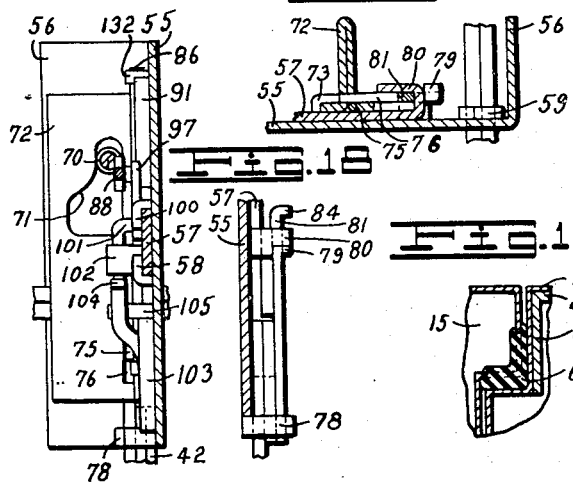
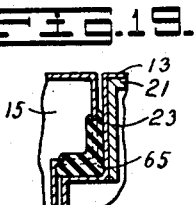
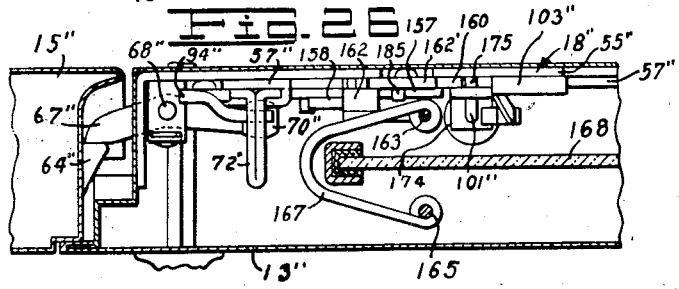
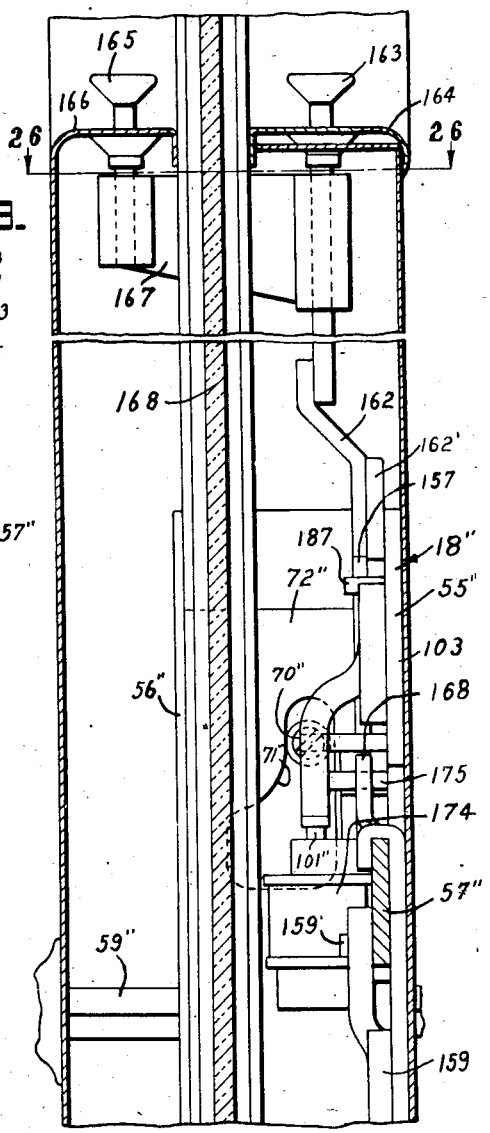
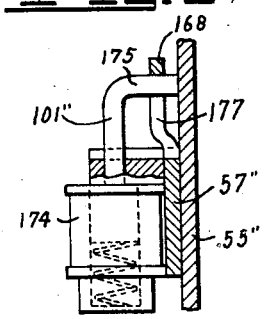
INVENTOR.
B. J. Craig Jan. 23, 1940.    B. J. CRAIG    2,187,934
VEHICLE DOOR LATCH CONTROL MECHANISM
Filed May 7, 1938    4 Sheets-Sheet 4
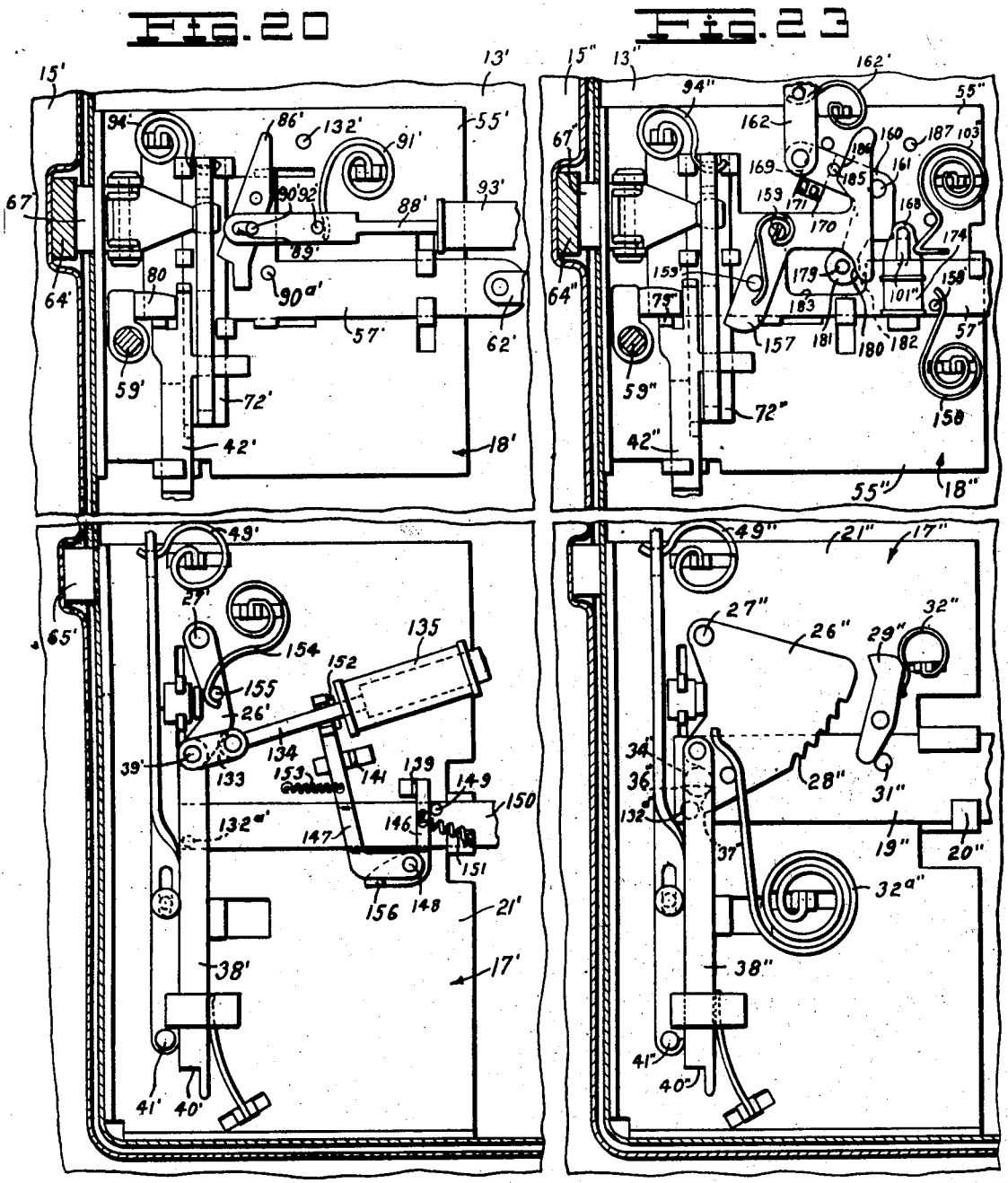
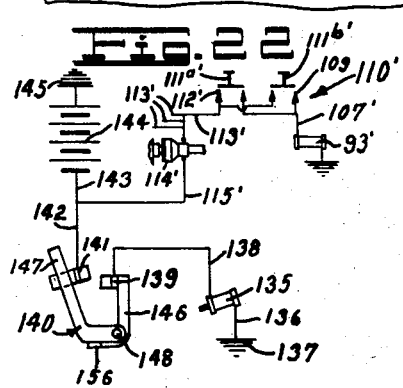
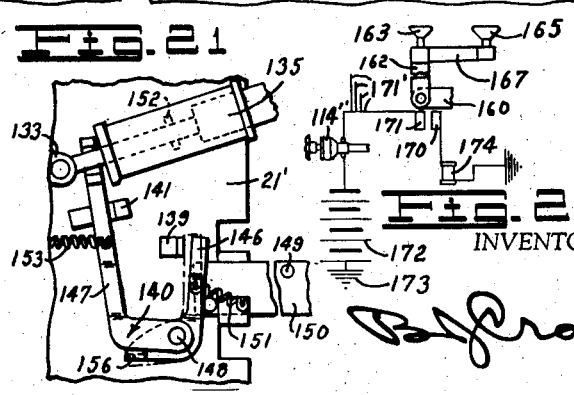

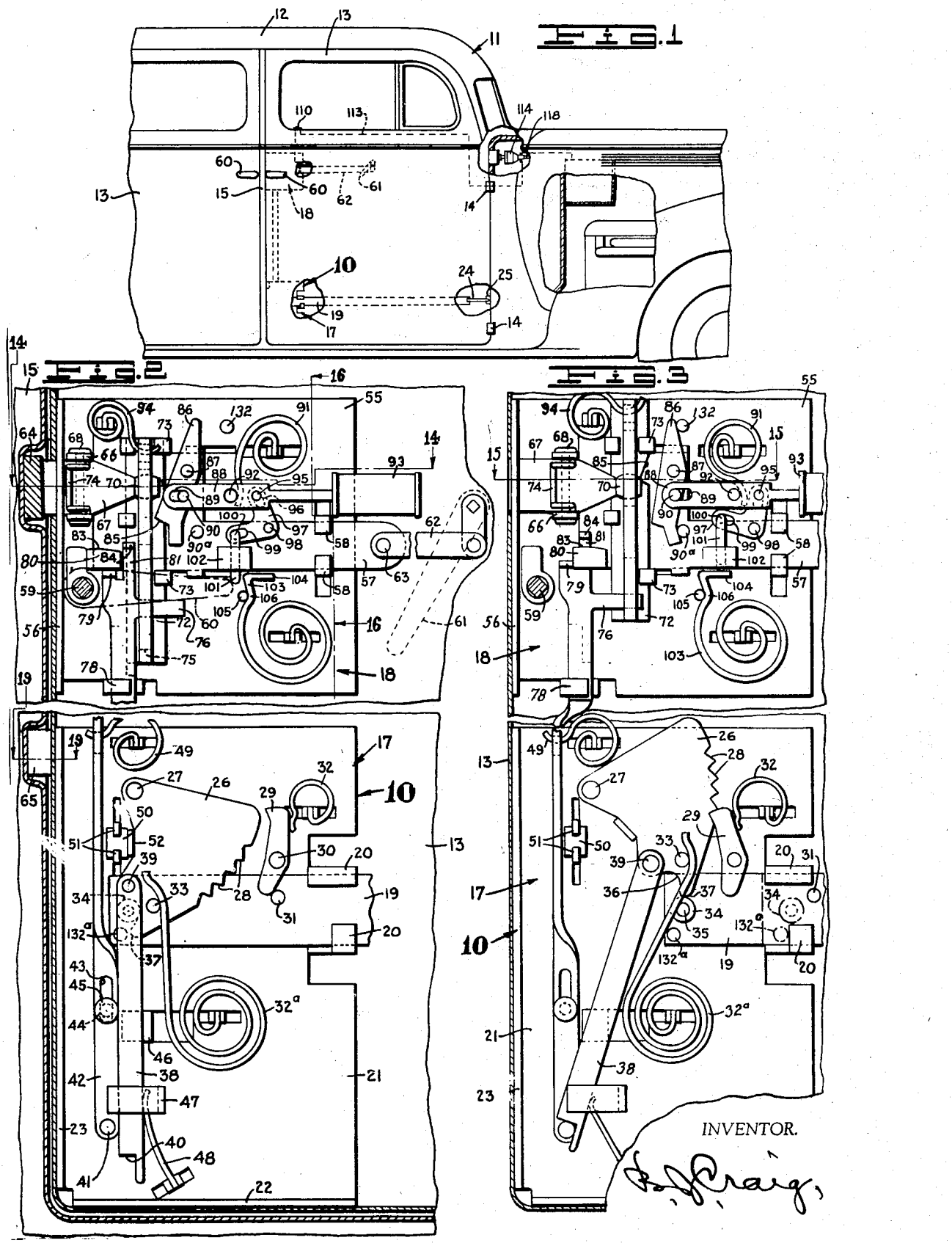

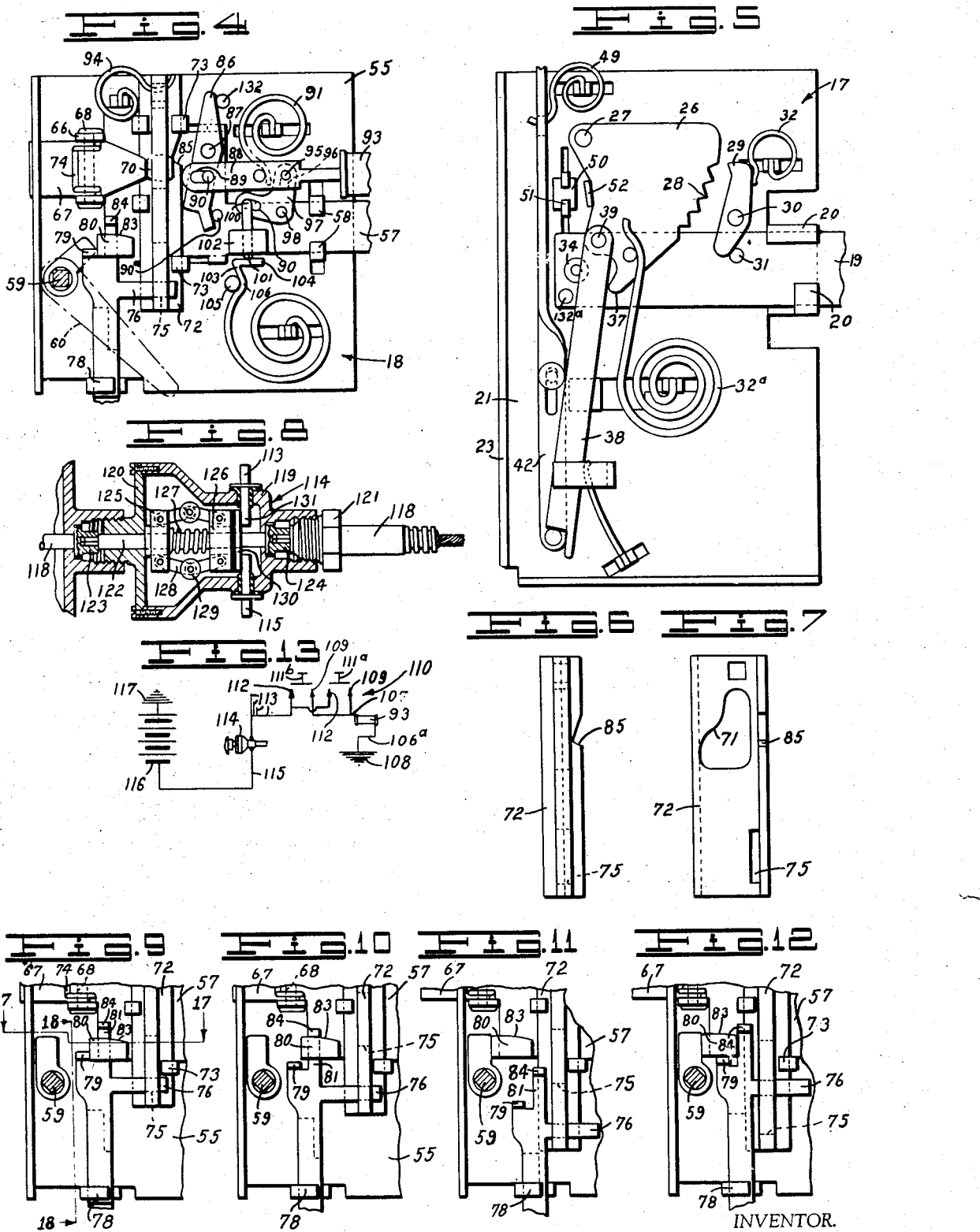

Patented Jan. 23, 1940

2,187,934

UNITED STATES PATENT OFFICE 2,187,934

VEHICLE DOOR LATCH CONTROL MECHANISM

Burnie J. Craig, Los Angeles County, Calif.

Application May 7, 1938, Serial No. 206,535

31 Claims. (Cl. 180—82)

This invention relates to door latching and control mechanism which is particularly, although not exclusively, adapted for use in connection with the doors of automotive vehicles, a general object being to provide a novel construction having cooperating parts adapted to be mounted upon the door and/or frame and/or body pillar with the parts acting in improved and effective manner to enable a door to be closed quietly and to be opened easily.

A more specific object of the invention is to provide a door control mechanism for an automotive vehicle which enables the passenger to settle himself comfortably and then easily swing the door by unimpeded movement to a position where the door is almost closed whereupon the bolt which is held within the door while the latter is open is moved to latching position and the door is automatically and positively moved quickly and quietly to closed position by means which may be energized by a previous movement of the door.

Automotive vehicle doors, due to manufacturing tolerances permitted, are somewhat loosely mounted and are held in tightly latched position against resilient bumpers to prevent rattling. This requires that the door be moved to latching position against a strong force exerted by the bumpers which tends to open the door and since the bumpers are compressed only momentarily, the latch bolt must be quickly projected otherwise the bumpers force the door open before the bolt is secure.

This requires the use of a very strong spring for urging the bolt to latching position and as a result considerable effort is required to cause the bolt to be retracted so that it may pass over the strike in the closing operation and again to retract the bolt by operation of the handle in opening the door. If a weak spring is employed for the bolt the latter may not move to latching position while the bumpers are compressed and further accidental opening, or opening by children, becomes a hazard.

It has also been found objectionable that the latch bolt frequently is not fully projected and as a result the door handle sags and consequently the roll back may not function smoothly and various means have been proposed seeking to overcome this objection.

It is a further object of the invention to provide novel latch means for the doors of automotive vehicles which overcomes or minimizes the objections noted and which in addition has other advantages.

A more specific object of the invention is to provide a door construction for an automotive vehicle including a latch and bumper wherein the latch is first engaged after which the bumper may be placed under full compression.

Another object of the invention is to provide a novel latch for the door of an automotive vehicle.

A further object of the invention is to provide a novel combined closing and latching mechanism for the door of an automotive vehicle.

An additional object of the invention is to provide an automotive vehicle door latch mechanism including a novel bolt construction.

A further object of the invention is to provide a novel finger tip control for the latch of the door of an automotive vehicle.

A further object of the invention is to provide a novel shiftable latch bolt construction for the door of an automotive vehicle.

Another object of the invention is to provide a novel speed controlled latching mechanism for the door of an automotive vehicle.

Another object of the invention is to provide an automotive vehicle door latch device including a retractable bolt wherein novel means is provided for holding the bolt retracted and for releasing the bolt.

Other objects and the advantages of my invention will be apparent from the following description taken in connection with the accompanying drawings, wherein:

Fig. 1 is a fragmentary side elevation showing an automobile equipped with the invention;

Fig. 2 is a side elevation showing the latch and control devices with the latch bolt engaged and shifted;

Fig. 3 is a side elevation showing the latch and control devices in another position;

Fig. 4 is a side elevation showing the latch device being actuated through the roll back by the door handle;

Fig. 5 is a side elevation showing the control device in another position;

Fig. 6 is a top plan view of the cam member;

Fig. 7 is a side elevation of the cam member;

Fig. 8 is a central sectional view through the governor;

Figs. 9, 10, 11 and 12 are fragmentary plan views showing the bolt control member in different positions;

Fig. 13 is a wiring diagram;

Fig. 14 is a section taken on line 14—14 Fig. 2;

Fig. 15 is a fragmentary section taken on line 15—15 Fig. 3;
Fig. 16 is a section taken on line 16—16 Fig. 2;
Fig. 17 is a fragmentary section taken on line 17—17 Fig. 9;
Fig. 18 is a fragmentary section taken on line 18—18 Fig. 9;
Fig. 19 is a fragmentary section taken on line 19—19 Fig. 2;
Fig. 20 is a side elevation showing a modified construction;
Fig. 21 is a fragmentary view showing details of the switch mechanism of the modification of Fig. 20;
Fig. 22 is a wiring diagram of the modification;
Fig. 23 is a side elevation showing a further modified construction;
Fig. 24 is a wiring diagram of the further modification;
Fig. 25 is an enlarged sectional view of the latch device, of the modification of Fig. 23, mounted in a door;
Fig. 26 is a section taken on line 26—26 Fig. 25; and
Fig. 27 is a fragmentary sectional view of the solenoid and associated parts as used in the further modification.

Referring to the drawings by reference characters the invention is shown as embodied in a door control mechanism which is indicated generally at 10 and is shown as mounted upon an automotive vehicle indicated at 11. The vehicle shown has a body 12 of the sedan type and includes doors 13 pivotally mounted on hinges 14, secured to the door frame, to swing towards and from a body pillar 15.

The control mechanism 10 on each door includes a control device indicated generally at 17 and a latch device indicated generally at 18.

The control device 17 includes a traction member 19 which is mounted to slide between tongues 20 on a supporting plate 21 having a bottom flange 22 and an end flange 23 and mounted on one of the doors 13. The traction member 19 is pivoted to a link 24 which in turn is pivoted to a bracket 25 secured to the door frame so that as the door opens and closes the traction member slides back and forth on the door and on the plate 21.

A lever member 26 is pivoted at 27 on the plate 21 and is preferably sector shaped and has teeth 28 in its outer edge which are engaged by a dog 29 which is mounted on a pin 30 secured on the plate 21. The dog 29 is adapted to be rocked by a pin 31 mounted on the traction member 19. The dog 29 is urged to its engaged position by a spring 32 on the plate 21. When the traction member moves outwardly relative to the door the pin 31 on the traction member rocks the dog 29 to free the latter from the teeth 28. On a return movement of the traction member the dog 29 moves away from the pin 31.

The lever 26 is adapted to be rocked downwardly about its pivot 27 by a spring 32a which is supported on the plate 21 and which engages a pin 33 on the lever. In order to energize the spring 32a a roller 34 is mounted on a pin 35 on the traction member 19 and this roller, when the door is opened, moves with the traction member to engage a cam surface 36 on the lever 26 to move the latter to fully energized position wherein the dog 29 engages the end tooth 28. After the lever 26 is thus energized further movement of the traction member causes the roller 34 to pass under the end portion 37 of the lever, thus allowing the door to be swung unimpeded to fully open position and back to closed position.

One end of a link 38 is pivoted at 39 to the lever 26 and at the other end has a shoulder 40 which engages a pin 41 mounted on a slidable control member 42. The control member has a slot 43 in which a pin 44 on the plate 21 is disposed. The pin 44 has a roller 45 thereon. The link 38 engages a tongue 46 bent up from the plate 21 to hold the link 38 in the plane of the roller 45. A tongue 47 on the plate 21 extends over the link 38 to prevent upward movement thereof.

A spring 48 on the plate 21 urges the link 38 against the pin 41 while a spring 49 on the plate 21 urges the control member 42 upwardly. A rubber bumper 50 engaged by tongues 51 on the plate 21 engages a tongue 52 bent from the lever 26 when the latter is in one extreme position.

The latch device 18 includes a plate 55 having a flange 56 thereon and is suitably secured upon the door 13. A latch member, indicated at 57, is mounted for sliding movement beneath tongues 58 on the plate 55, and it is adapted to be shifted to unlatching position (as will be presently described) by a roll back 59 which may be actuated by an outside door handle 60. A remote control handle 61 shifts an actuator 62 which is pivoted at 63 to the latch member 57 to open the door. A strike 64 is mounted on the pillar 15 opposite the latch member while spaced bumpers 65, which may be made of rubber are positioned to be tightly engaged by the door when the latter is closed. The strike, bumper, roll back and remote control are of well known construction.

According to the present invention the latch member 57 is provided with spaced ears 66 on which a bolt 67 is pivotally supported by a pin 68. The bolt 67 is so mounted on the latch member that it may rock about the pin 68 as well as be advanced and retracted when the latch member 57 is shifted. At its outer end the bolt 67 includes a cam face 69 which engages the strike 64 as best shown in Figs. 14 and 15. The inner end of the bolt 67 has a roller 70 thereon which is engaged by a cam surface 71 on a cam member 72 which is slidable transversely across the latch member 57 beneath tongues 73 which are integral with the latch member 57 and the construction is such that when the cam member 72 is moved downwardly in Fig. 3 the bolt 67 will be rocked on the pin 68 from the position shown in dotted lines in Fig. 15 to the position shown in Fig. 14, and when the cam member is moved in a reverse direction it will allow the bolt to be rocked in the opposite direction by means of a spring 74 which engages the bolt.

In order to shift the cam member 72 and thus shift the bolt 67, the cam member is provided with a slot 75 through which an arm 76 on the upper end of the control member 42 extends and the construction is such that when the dog 29 is released the lever 26 and link 38 will cause the shoulder 40 on the link 38 to shift the pin 41 downwardly in Fig. 3 and thus shift the control downwardly and consequently shift the arm 76 and the cam member 72.

The control member 42 is spaced slightly above the plate 55 and is guided by tongues 78 on the plate 55. The control member 42 includes an outwardly directed tongue 79 (see Figs. 9 to 12) which is disposed in the path of a bent up tongue 80 on the latch member 57 so that when the parts are in the position shown in Figs. 3 and 9 the latch member and bolt are held retracted and as a result the latch bolt is concealed during the entire time the door is open so that any grease on the bolt cannot soil the clothing or person of the passenger entering or leaving the vehicle.

As soon as the control member has been shifted downwardly to the position shown in Fig. 10 the latch member 57 with the bolt 67 is advanced to engaged position by means to be later described. To prevent the control member 42 from shifting the cam member 72 and thus rocking the bolt 67 on its pin 68 before the bolt is fully advanced, the control member is provided with an upwardly extending portion 81 which passes over the latch member 57 and beneath the tongue 80 which has a curved upper edge 83 which is engaged by an outwardly directed tongue 84 on the portion 81.

It will thus be apparent that when the control member is moved down by the lever 26 and link 38, which constitute a toggle, the first movement will shift the control member thus causing the tongue 80 to be disengaged to release the latch member 57.

The same movement brings the tongue 84 into engagement with the curved edge 83 on the tongue 80 and thus temporarily arrests further movement of the control member 42 until the tongue 80 clears the tongue 84 whereupon the control member 42 is free to move downwardly to the position shown in Fig. 11. The tongue 84 arrests movement of the toggle when the leverage of the latter is slight so that no undue binding occurs between the tongue 80 and the tongue 84.

The control member 42 being freed as described then completes its downward movement moving the cam member 72 with it and thus shifting the latch bolt 67 about its pivot 68.

The cam member 72 is provided with a notch 85 on one edge which when the cam member is in its fully advanced position is engaged by a dog 86 which is pivoted on a pin 87 mounted on the latch member 57. The dog 86 is normally urged to engaged position by a plunger 88 which has a slot 89 therein and in which a pin 90 on the dog 86 slides. A pin 90a (the function of which will be later described) is secured on the latch member 57 in the path of movement of the dog 86. A spring 91 on the latch plate 55 engages a pin 92 on the plunger 88 so that the spring through the plunger 88 and pin 90 moves the dog 86 to engaged position as shown in Fig. 2.

As soon as the dog 86 moves to engaged position the shoulder 40 leaves the pin 41 (see start of this motion in Fig. 5) thus freeing the control member 42 and allowing it to be shifted upwardly by the spring 49. The slot 75 is elongated so that the arm 76 moves along this slot to the position shown in Fig. 12.

One end of the plunger 88 constitutes the core of a solenoid 93 which when energized in a manner to be later described moves the plunger 88 to the right in Fig. 2 until the pin 90 engages the outer end of the slot 89 whereupon further movement of the plunger moves the dog 86 from the notch 85 thus freeing the cam member 72. When this is done the cam member moves upwardly being urged by a spring 94 mounted on a tongue on the latch member 57.

The spring 91 is preferably a light one and the use of such a spring might if left unguarded, produce a condition under certain circumstances which, while the vehicle is running, would permit the door to open accidentally or might allow it to be opened by curious persons such as children. To overcome this possibility a novel latch construction is employed which includes a push button or other control which is adapted to be operated by a relatively light touch such as a finger tip pressure and wherein speed responsive means is employed to enable the use of finger tip pressure to open the door when the vehicle is still or when it is moving at a slow speed but which requires the use of the leverage secured through the handle control when the vehicle speed is increased.

To produce this result the plunger 88 has a pin 95 thereon which engages in a slot 96 in one end of a bell crank 97 which is pivoted on a pin 98 on the latch member 57. The other end of the bell crank includes a slot 99 in which the bent end 100 of a pin 101 is mounted.

This pin 101 moves in a guide 102 on the latch member 57. The spring 91 normally urges the plunger 88 forwardly to the position shown in Fig. 2 wherein the pin 101 is spaced from a spring 103 which is mounted on the plate 55.

The upper end of the spring 103 includes a flat portion 104 which is parallel to the latch member 57 and which prevents the pin 101 from being positioned in the rear of the spring 103. A pin 105 on the plate 55 limits the forward movement of the free end of the spring 103 while a curved portion 106 on the spring engaging the pin 105 tends to prevent downward movement of the portion 104 of the spring should the pin 101 engage the portion 104.

The solenoid 93 includes a pair of leads 106a and 107 (see Fig. 13). The lead 106a is grounded at 108 while the lead 107 is connected to terminals 109 of a duplex switch device 110 which includes an operating push button 111a which is located preferably on the window frame (see Fig. 1) outside of the vehicle window, while a second push button 111b may be mounted as e. g. on the garnish molding within the vehicle. The push buttons 111a and 111b close the circuit from terminals 109 to one of a pair of terminals 112. The terminals 112 are connected by a lead 113 with a governor 114, while another lead 115 extends from the governor to a battery 116 which is grounded as at 117. The lead 113 from the governor to the switches 111a and 111b passes from the vehicle frame to the door, preferably adjacent one of the hinges 14.

The governor 114 is shown as connected to the speedometer drive shaft 118, although it will be understood that this speedometer shaft is merely illustrative of one device which is responsive to speed and that the governor 114 may be otherwise driven so long as it responds to the speed of some portion of the vehicle or its driving means.

The governor 114, as shown, includes a body 119 having a closure 120 thereon at one end and having a plug closure 121 at the other end. The body includes a shaft 122 which rotates therein and which at one end includes a coupling 123 of any desired type by means of which the shaft 122 is coupled to one portion of the speedometer shaft 118. The shaft 122 also includes a coupling portion 124 by means of which it is connected to another portion of the speedometer shaft 118.

The shaft 122 includes a collar 125 fixed thereon and a second collar 126 slidable thereon, the collars being urged apart by a spring 127. The collars are connected by pivoted arms 128 which have governor weights 129 thereon, and the construction is such that when the shaft 122 revolves the weights 129 move outwardly thus compressing the spring and shifting the movable collar 126. The tension of the spring 127 determines the shifting of the movable collar so that the latter is moved from its extreme position when the speedometer shaft rotates at a predetermined speed. The collar 126 has an insulating portion on which a metal circuit closer 130 is mounted. The circuit closer 130 when the spring 127 urges it to operative position engages contact pins 131 in the body 119. The pins 131 are connected to the leads 113 and 115.

The operation of the device is as follows. Assuming that the parts are in the position shown in Fig. 3 which is the position assumed when the door latch has just been released due to the action of the solenoid 93 as will later be described. The passenger then settles himself and gently pulls the door towards closed position. When the door is almost engaging the bumpers 65 the movement of the traction member 19 causes the pin 31 thereon to rock the dog 29 thus freeing the lever 26 which swings about its pivot thus moving the link 38 downwardly and straightening the toggle. The bumper 50 engaging the tongue 52 on the lever 26 serves to limit the movement of the toggle forming members and silences the action thereof.

The shoulder 40 on the link 38 engages the pin 41 on the control member 42 and thus moves this control member downwardly.

When the control member 42 moves downwardly the tongue 79 moves from the position shown in Fig. 9 in front of the tongue 80 on the latch member so that the latch member 57 is free to move forwardly being urged by the spring 91 which shifts the plunger member 88, the latter pushing the dog 86 and the dog 86 in turn pushing the cam member and the latter acting to shift the latch member 57 outwardly.

This movement of the latch member from a position at rest must occur before the control member 42 completes its downward movement to shift the cam member 72, and to delay this action of the control member 42 the tongue 84 thereon engages the surface 83 on the tongue 80 as shown in Fig. 10 thus preventing further movement of the control member until the latch member has been fully advanced, whereupon the control member acting through the arm 76 pulls the cam member 72 downwardly until the dog 86 enters the notch 85, the dog being urged to engaged position through the agency of the spring 91, plunger 88 and the pin 90, the latter being on the dog 86.

The parts are so arranged that at the time the dog 86 engages the notch 85 the roller 45 is engaged by the link 38 so that the latter is rocked outwardly with the shoulder 40 thereon moving away from the pin 41 (see Fig. 5) so that the parts assume the position shown in Fig. 2.

As the control member moves downwardly under the action of the toggle the cam member 72 acts on the roller 70 to shift the latching bolt from the dotted line position shown in Fig. 15 to the position shown in Fig. 14. This action moves the door 13 from its safety latched position to its fully closed position. In this position the bumpers 65 are fully compressed so that there is no rattling. The action of the bolt in shifting to fully closed position being controlled by the toggle causes the bolt to tightly compress the bumper due to the final powerful leverage of the toggle and the bolt remains in its engaged position due to the action of the dog 86 which is engaged in the notch 85.

The toggle action and its relation to the cam member 72 is such that at the end of the movement great pressure is exerted by the toggle, as will be readily understood.

When the pin 41 is freed from the shoulder 40 the control member 42 is raised by the spring 49 with the arm 76 moving in the slot 75 to the position shown in Fig. 12. The door has thus been brought to closed position where the bumpers are tightly compressed. The construction assures that the latch bolt is fully advanced since the bolt does not contact the strike while it is advancing and there is nothing to impede its movement. When the bolt is shifted on its pivot the action closes the door and causes its bumpers to be tightly compressed. The entire action occurs without slamming the door.

When the door is in the position shown in Fig. 2 the latch member 57 is urged forward by the spring 91 as previously described. Retraction of the latch member is thus restrained by its frictional engagement with its strike and by the spring 91 and is also restrained by the pin 101 on the latch member 57 which when the latter is retracted engages the upper portion of the spring 103 so that the spring 103 which is relatively stiff must also be stressed to shift the latch bolt. Thus it will be apparent that when the latch bolt 67 is shifted from the position shown in Fig. 2 by the outside handle 60 or the remote control handle 61 (as will be presently explained) that a considerable force will be required to start movement of the latch bolt so that accidental or unauthorized shifting of the bolt is prevented.

When, however, either of the push buttons 111a or 111b is operated to close the circuit through the governor 114, then if the governor is in such condition that the circuit is closed therethrough, current will be supplied from the battery 116 to the solenoid 93, thus energizing the solenoid and causing the plunger 88 to shift to the right in Fig. 2.

This action first rocks the bell crank 97 and lifts the pin 101 so that it will not strike the spring 103 when the latch member 57 is shifted and thus the restraining action of this spring 103 is avoided. Continued movement of the plunger 88 causes the pin 90 to engage the end of the slot 89 and thus swing the dog 86 about its pivot thus freeing the cam member 72 so that the latter is moved upwardly by a spring 94 mounted on the latch member 57.

This act of shifting the pin 101 and the movement of the cam member allows the bolt 67 to freely shift about its pivot 68 so that it shifts before the latch member 57 starts its retraction movement. Continued movement of the plunger 88 shifts the dog 86 until this dog strikes the pin 90a thus preventing further shifting of the dog 86 about its pivot so that further movement of the plunger 88 causes a translation of the dog 86 and a consequent sliding motion of the latch member 57 so that the latter moves to fully retracted position, whereupon the tongue 79 on the control member 42 moves to position in front of the tongue 80 so that the bolt is held retracted.

It will be noted that the solenoid 93 does not produce a heavy drain on the battery due to the fact that the first operation merely raises the pin 101 and that the second operation while the speed of the solenoid core is being increased consists merely of moving the core against the action of the light spring 91 and pulling the dog 86 from its engaged position. The third action of the solenoid after its speed has been further increased serves to retract the latch member 57 and the bolt 67 only after the bolt 67 has been shifted from tight engagement with its strike due to the pivoting action of the bolt 67 so that the resistance of the light spring 91 only must be overcome in shifting the latch member 57 to fully retracted position.

When the latch member is retracted by either the handle 60 or the remote control 61 the roll back 59 moves the latch member 57 to the position shown in Fig. 4 against the action of the springs 91 and 103. As the latch member moves rearwardly the cam member retains its position so that the friction between the bolt and its strike is not released and this friction adds to the force required to shift the latch bolt thus adding to the safety feature.

The latch bolt moves toward releasing position until the upper end of the dog 86 engages a pin 132 on the plate 55. After this engagement further movement of the latch member causes the pin 132 to rock the dog 86 from the notch 85 and thereby release the cam member which is then shifted, so that the latch bolt assumes a fully retracted position and is held retracted by the tongues 79 on the control member as shown in Fig. 4.

During the movement just described the plunger 88 has moved farther than the latch member 57 and has caused the bell crank 97 to lift the pin 101 from engagement with the spring 103 at substantially the same time that the dog 86 releases the cam member 72 so that it is lightly engaging the flat portion 104 of the spring.

When the latch bolt is released and the door is swung towards open position the traction member 19 moves across the plate 21 and in so doing the roller 34 engages the cam surface 36 on the lever 26 and thus starts to rock the lever 26 to thereby energize the spring 32a. This motion continues while the door is being opened until the roller 34 passes under the end portion 37 of the lever 26 so that the dog 29 engages the end tooth 28 to hold the lever in cocked position. Preferably the energizing movement is completed when the door is opened approximately 30° thus assuring that the spring will be fully cocked every time a passenger enters or leaves the vehicle.

After the parts assume the position shown in Fig. 3 with the door 30° open further opening of the door causes the traction member to move outwardly to the dotted line position shown in Fig. 3 wherein a pin 132a on the traction member engages one of the tongues 20 previously described to thus limit the opening movement of the door. When the door is closed the traction member 19 moves across the plate 21 until the pin 31 engages the dog 29 to release the lever 26 as has been previously explained.

In Fig. 20 a modification is shown wherein the control device indicated generally at 17' and the latch device indicated generally at 18' are similar in most respects to the control device 17 and latch device 18 previously described, and similar parts have been designated by similarly primed reference numerals. In the modification a lever 26' is pivoted to the link 38' at 39' to form a toggle. This toggle is adapted to be straightened by a link 133 which is pivoted to the link 38' at one end and at the other end is pivoted to the core member 134 of a solenoid 135. One of the terminals 136 of the solenoid is grounded as at 137, while the other terminal 138 extends to one contact 139 of a switch 140 while the other contact 141 which is a spring member is connected by a lead 142 which extends across the hinge line to a lead 143 and to a battery 144, which is grounded as at 145.

The contacts 139 and 141 of the switch 140 are adapted to be bridged by a circuit closer which includes pivoted arms 146 and 147 which are pivoted at 148 and which are insulated from the plate 21' but which are in circuit with each other. A pin 149 is mounted on a traction member 150 which is slidable on the plate 21' across the door and is secured preferably to the frame in a suitable manner as by a link 24 and bracket 25 previously described. When the traction member 150 moves to the left in Fig. 20 it moves the pin 149 and rocks the arm 146 against the tension of a spring 151 causing the arm to engage the contact 139 and closing the circuit through the other arm 147 to the other contact 141 so that the solenoid is energized and the toggle is straightened thus pulling the control member 42' downwardly.

The arm 147 is normally engaged by the spring contact 141 which holds the arm in the circuit closed position. When the solenoid core reaches the position shown in Fig. 20, a pin 152 thereon rocks the arm 147 from engagement beneath the spring contact 141. When the arm 147 is thus freed a light spring 153 retains the arm in the disengaged position so that the solenoid circuit is opened thus allowing a spring 154 engaging a pin 155 on the lever 26' to shift the solenoid core without shifting the arm 147 so that the spring 153 maintains the arm from circuit closing position. When the door is opened the traction member 150 shifts the pin 149 so that the spring 151 shifts the arm 146 to the position shown in Fig. 21. The spring 151 is stronger than the spring 153 and when the arm 146 is shifted a tongue 156 thereon engages the arm 147 and shifts the arm 147 so that it again engages the spring contact 141 and remains in engagement since the spring 153 is not sufficiently strong to shift the arm from the spring contact 141.

In the modification of Fig. 20 the latch device 18' includes the finger tip operated speed responsive mechanism and is similar in all respects to the latch device 18 except that in the modification the bell crank 97, pin 101 and spring 103 are omitted.

In operation of the modification shown in Fig. 20, when the door is closed the solenoid 135 is energized as previously described thus shifting the toggle composed of the lever 26' and link 38' to thus shift the control member 42' and thus act on the cam member 72' to move the latch bolt 67' to latching position.

After the door is latched it is adapted to be opened by operating either the switch 110' which is similar in all respects to the switch 110 previously described. This operation of the switch energizes the solenoid 93' and shifts a plunger 88' so that the latter shifts the dog 86' when the pin 90' moves to the end of the slot 89' to thus first free the cam member 72' from engagement by the dog 86' and thereafter cause the latch member 57' to be retracted. Due to the fact that the dog 86' is first released before the latch member is retracted it enables a relatively light solenoid 93' to perform the opening operation since the pressure between the latch bolt and its strike is removed when the dog 86' is released.

When the modification shown in Fig. 20 is released by means of the roll back 59' the frictional engagement between the latch bolt and its strike must be overcome as must the resiliency of the spring 91' so that in this operation much force is required to shift the door handles.

In Fig. 23 a further modification is shown wherein the control device indicated generally at 17'' is identical in all respects with the control device 17 previously described. In this modification the latch device 18'' is similar in most respects to the latch device 18 previously described and is urged to advance position by a spring 158 which engages a pin 158' on the latch member. In the further modification parts similar to those previously described are indicated by double primed reference characters.

In the further modification a dog 157 engages a notch in the cam member 72'' to hold the cam member after the latter has been shifted. The dog 157 is pivoted at 158 on the latch member 57'' and is urged to engaged position by a spring 159 which engages a pin 159' on the dog member 157.

In order to rock the dog 157 I provide a bell crank member 160 which is arranged beneath the dog and is pivoted at 161 to the plate 55''. The member 160 is pivotally connected to the lower end of a finger tip release member 162 which is normally urged upwardly by a spring 162'. The upper end of the member 162 includes a finger tip button 163 (Fig. 25) mounted on the garnish molding 164. A second release button 165 mounted on the window frame 166 is connected to the stem of the push button 163 by a U-shaped member 167 which passes around the door window 168 as is clearly shown in Fig. 26. It will be apparent that the release member 162 may be operated by finger tip pressure on either of the buttons 163 or 165.

The member 160 includes a circuit closer 169 which is suitably insulated and which closes the circuit through a pair of spaced contacts 170 and 171. The contact 171 includes a lead 171' which passes through the governor 114'' to a battery 172 and to a ground 173, while the contact 170 extends to a solenoid 174 mounted on the latch member 57''. The solenoid 174 includes a normally advanced pin 101'' (see Fig. 27) which has a bent end portion 175 disposed in a slot 177 in a tongue 178 on the latch member 57''. A spring 103'' like the spring 103 previously described is engaged by the pin 101''.

When either of the finger tip release buttons 163 or 165 is pressed while the governor is in circuit closing position the release member 162 is moved downwardly thus moving the member 160 to first cause the circuit closer 169 to close the circuit across the contacts 170 and 171 and energize the solenoid 174. This action causes the solenoid to shift the pin 101'' from the path of the spring 103''.

After the pin 101'' is shifted a pin 179 on the bell crank 160 engages a portion 180 of the dog 157 and as the bell crank is further rocked the pin 179 causes the dog 157 to be released to thus release the cam member 72''. Further movement of the member 162 by either finger tip buttons causes the lower portion 181 of the member 160 to engage a shoulder 182 at the end of a recess 183 in the latch member 57'' so that as the member 160 is rocked it retracts the latch member 57'' against the tension of the spring 159 on the plate 55''.

This movement continues until the latch member 57'' is moved to fully retracted position where it is engaged by the tongue 79'' as will be understood from the preceding description. A pin 185 on the member 160 engages the end portion 186 of the dog 157 and normally locks the dog against releasing movement. The dog 157 cannot be moved to disengaged position by vibration or wearing of the vehicle body unless the control member 162 has moved to shift the pin 185 from the position shown in Fig. 23.

Should the governor 114'' not be in circuit closing position as when the vehicle is at rest it is necessary to apply so much pressure to the finger tip buttons 163 or 165 that it is impractical to shift the latch in this fashion since under these circumstances it would be necessary to shift the latch member 57'' against the tension of both springs 159 and 103''.

When the roll back 59'' is employed to shift the latch device 57'' by turning the door handle or remote control handle the dog 157 moves with the latch member 57'' and the bell crank 160 is not shifted. The shifting of the latch member 57'' by the roll back continues until the upper portion of the dog 157 engages a pin 187 on the plate 55'' to thereby shift the dog 157 and release the control member 72''. Thus it will be seen that not only must the springs 59 and 103'' be tensed, but also the friction between the latch bolt 67'' and its strike 64'' must be overcome when the roll back is actuated.

Having thus described my invention I claim:

1. In an automotive vehicle construction, a frame member, a door member hinged to the frame structure, a bolt on one of the members movable to engage the other member to hold the door member closed, means to restrain retraction of the bolt, means whereby the speed of the vehicle determines the force of the restraining means and electro-magnetic means effective to retract the bolt under a predetermined condition of the restraining means but ineffective to retract the bolt under other conditions of the restraining means.

2. In an automotive vehicle door construction, including a frame member and a door member, a bolt movable on one of the members to engage the other member, means to restrain retraction of said bolt, means to vary the effect of the restraining means so that the bolt is selectively under the influence of a heavy force or a light force, and speed controlled electro-magnetic means operable to retract the bolt only when the bolt is under the influence of the light force.

3. In an automotive vehicle door construction including a frame member and a door member hinged to the frame member, a bolt movable on one of the members to engage the other member to hold the door member closed, variable means to normally restrain retraction of the bolt so that the bolt is selectively under the influence of a light force or a heavy force, hand operated means operable to retract the bolt under both variations of the restraining means and electro-magnetic operated means operable to retract the bolt only when the bolt is under the influence of the light force.

4. In an automotive vehicle construction, a frame member, a door member hinged to the frame member, a bolt on one of the members movable to engage the other member to hold the door member closed, means to restrain retraction of the bolt, means responsive to the speed of the vehicle to vary the force of the restraining means so that the bolt is selectively under influence of a light force or a heavy force, hand operated means to retract the bolt when under all variations of the restraining means and electro-magnetic means effective to retract the bolt when under the influence of the light force, said electro-magnetic means being ineffective to shift the bolt when under the influence of the heavy force.

5. In an automotive vehicle construction, a frame member, a door member, a bolt movable to advanced position on one member to engage the other member to hold the door member closed, said bolt being pivotally mounted, means to move the bolt to advanced position, means to shift the bolt on its pivot and means to prevent actuation of the shifting means until the bolt is in advanced position.

6. In a construction for automotive vehicles including a body member having a door opening and having a door member hinged at one side of the opening, latch means on one member engaging a strike on the other member to hold the door member closed, vehicle speed controlled means operable to release the latch means and means to control the pressure of the latch on the strike prior to the release of the latch means.

7. In an automotive vehicle construction, a frame member, a door member hinged to the frame member, a bolt on one of the members movable to engage a strike on the other member to hold the door member closed, means to restrain the retraction of the bolt, means whereby the speed of the vehicle determines the force of the retraction restraining means, means to control the pressure of the engagement between the bolt and its strike and means to retract the bolt.

8. In a construction for automotive vehicles including a body member having a door opening and having a door member hinged at one side of the door opening, a bolt on one of the members engaging the other member to hold the door member closed, a bumper on one of the members engageable by the other member to press the bolt tightly against the other member, means to urge the bolt to engaged position, means to move the bolt to disengaged position, and means operable to reduce the pressure between the bumper and the other member prior to the action of the bolt moving means.

9. In a door construction for automotive vehicles including a frame member and a door member, a bolt on one of the members adapted to engage the other member to hold the door member closed, means to hold said bolt in engaged position, electro-magnetic means to shift said bolt to retracted position, spring means to at all times restrain movement of the bolt to retracted position and other means responsive to speed of the vehicle to restrain movement of the bolt to retracted position.

10. In a door construction for automotive vehicles including a frame member and a door member, a bolt movable on one of the members to engage the other member, means to restrain retraction of said bolt, means to retract said bolt, means to advance the bolt, means to pivot the bolt after it has advanced, means to hold the bolt advanced and electro-magnetically controlled means to release the bolt holding means.

11. In a door construction for automotive vehicles including a frame member and a door member, a bolt pivoted on one of the members adapted to engage the other member to hold the door member closed, means to restrain movement of said bolt from engaged position, hand operated means to shift said bolt to retracted position, and vehicle speed controlled means operable to vary the effect of the restraining means.

12. In an automotive vehicle construction, a frame member, a door member, a strike on one member, a slidable bolt on the other member movable to engage the strike, means to mount said bolt for pivotal movement, means to swing the bolt about its pivot after it is in engaged position against the strike, means to hold the bolt after it has been swung about its pivot, and vehicle speed influenced means to release the holding means.

13. In an automotive vehicle construction, a frame, a door pivoted thereon, a bolt member, a strike member engagable by the bolt member, means to movably mount one of said members, means to shift the movably mounted member in a direction to tighten the engagement between the members after the bolt is engaged, latch means to releasably hold the movably mounted member in tightly engaged position and vehicle speed influenced means to control the releasable holding means.

14. In an automotive vehicle door latch construction, a bolt movable to engaged and released positions, means to move the bolt to fully engaged position, means subject to vehicle speed and operable to cause the bolt to move to released position, and means actuated by movement of the door to energize the moving means.

15. In an automotive vehicle latch construction, a bolt, means to mount said bolt for pivotal movement, means to shift the pivot of the bolt and to swing the bolt about its pivot after the bolt and its pivot have been shifted and means subject to vehicle speed and operable to release the bolt after it has been shifted.

16. In an automotive vehicle door latch, a bolt, means to move said bolt to engaged position, means operable at all vehicle speeds to move the bolt to disengaged position, other means to cause said bolt to move to disengaged position, said last mentioned means including an electro-magnet and one or more circuits therefor including a hand operated switch and a vehicle speed responsive circuit closer, said switch being operable to cause the bolt to move to disengaged position only when the vehicle speed is below a certain rate.

17. In a vehicle door latch, a bolt, means to move the bolt to engaged position, means to tighten the engagement of the bolt after it is in engaged position, means to restrain movement of the bolt from tightened position and speed controlled means operable to release the restraining means.

18. In a door latch, a bolt including a strike engaging portion, means to mount the strike engaging portion of the bolt for pivotal movement about an axis transverse to the bolt, means to retract the bolt, the bolt having a safety latched position and a fully latched position, means urging the bolt from safety latched position to fully latched position, means to prevent operation of the urging means, and means to free the preventing means after the bolt has reached the safety latched position.

19. In an automotive vehicle door latch, a bolt, means to move the bolt to engaged position, release means energized by door movement and operable to move the bolt to disengaged position, and manually operable vehicle speed controlled means for governing actuation of the release means.

20. In a latch construction, a unitary bolt member, means to mount the bolt member to advance and retract, means permitting the bolt member to shift back and forth while advanced, means to first advance and thereafter to shift the bolt member and speed controlled means operable to release the bolt.

21. In a vehicle door latch, a bolt, means to move the bolt to engaged position, means to tighten the bolt after it is in engaged position, and means energized by door movement to actuate the tightening means.

22. In a vehicle door latch construction, a bolt, means to mount the bolt to advance and retract in a path, means permitting the bolt to move back and forth across the path along which it has advanced, means to first advance and thereafter to move the bolt to engaged position and vehicle speed controlled means operable to release the bolt after it is engaged.

23. In an automotive vehicle door control device, a bolt, means to move the door to bolt engaging position, means operable by movement of the door to bolt engaging position to move the bolt to engaged position, and means operated by the door moving means to tighten the bolt after it is in engaged position.

24. In an automotive vehicle door latch, a bolt movable to advanced position, toggle means operable upon straightening to shift the bolt after it has been advanced, means to straighten the toggle and means to prevent straightening of the toggle until after the bolt has advanced.

25. In an automotive vehicle door latch, a bolt movable to advanced and retracted positions, toggle means to advance the bolt, the bolt being shiftably mounted and means whereby the toggle means shifts the bolt after it has been advanced.

26. In an automotive vehicle door latch, a bolt, means to movably mount the bolt, a toggle, means whereby straightening of the toggle advances the bolt, means to straighten the toggle and means operated by door movement to energize the toggle straightening means.

27. In an automotive vehicle door latch, a bolt movable to engaged and to released positions, a spring, means whereby the spring urges the bolt to engaged position, means to tension the spring, means to free the spring tensioning means and vehicle speed influenced means operable to release the bolt after the tensioning means is freed.

28. In an automotive vehicle door latch construction, a bolt, means to advance the bolt, means to release the bolt, means to simultaneously energize both means, means to normally prevent operation of the advancing means and the releasing means after the same are energized, means operable upon door movement to free the advancing means, and other speed controlled means to actuate the releasing means.

29. In a vehicle door latch, a movable bolt, means to move the bolt to engaged position, means to tighten the engagement of the bolt after it is in engaged position, means to restrain movement of the bolt from tightened position, speed controlled means operable to release the restraining means and manually operable means independent of speed and effective to release the restraining means.

30. In a latch construction, a bolt, means to mount the bolt to advance and retract, means permitting the bolt to shift back and forth across its path while advanced, means to cause the bolt to advance, means to retract the bolt and means to prevent shifting of the bolt until after it has advanced and to prevent retraction of the bolt until after the latter has shifted.

31. In a vehicle door latch construction, a bolt, means to mount the bolt to advance and retract, means permitting the bolt to shift back and forth across its path when advanced, means to cause the bolt to advance, vehicle speed controlled means to release the bolt and means to prevent shifting of the bolt until after it has advanced and to prevent release of the bolt until after the latter has shifted.

BURNIE J. CRAIG.